April 4, 1944.  F. WILSON  2,346,099
CHAIN HOOK
Filed July 18, 1942
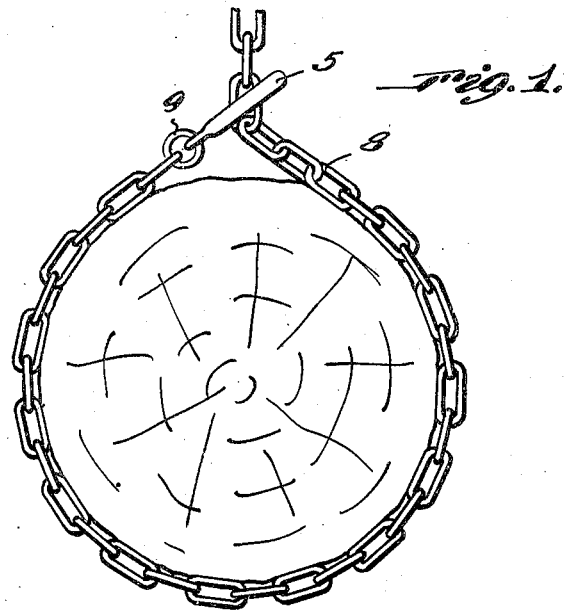
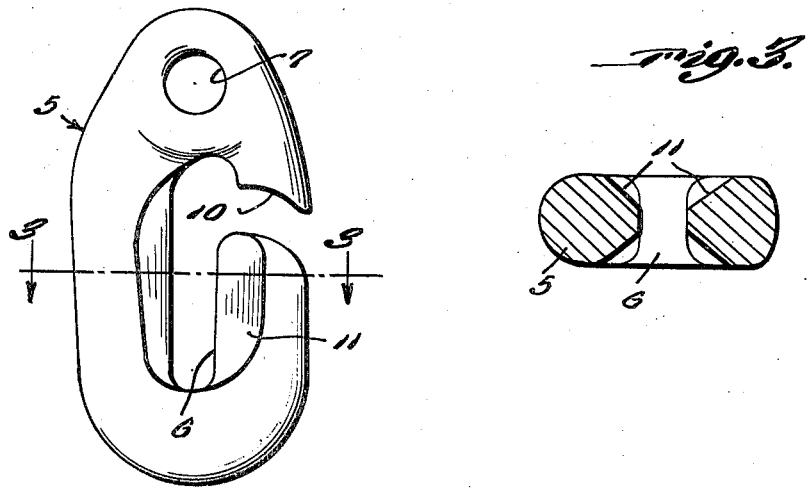
Inventor
Frank Wilson
By Clarence A. O'Brien
and Harvey B. Jacobson
Attorneys Patented Apr. 4, 1944

2,346,099

UNITED STATES PATENT OFFICE 2,346,099

CHAIN HOOK

Frank Wilson, Boone, Iowa

Application July 18, 1942, Serial No. 451,457

3 Claims. (Cl. 24—230.5)

The present invention relates to new and useful improvements in hooks adapted primarily for use as a logging chain hook and for similar purposes where the chain is secured around an object by the hook, and the invention has for its principal object to provide a hook adapted for engaging the outside of a link of the chain without danger of the hook slipping on the chain.

A further object is to provide a hook of this character of simple and practical construction, which is efficient and reliable in use, strong and durable, and otherwise well adapted for the purposes for which the same is intended.

Other objects and advantages reside in the details of construction and operation as more fully hereinafter described and claimed, reference being had to the accompanying drawing forming part hereof, wherein like reference numerals refer to like parts throughout, and in which:

Figure 1 is a view showing the hook in position for securing a chain on a log.

Figure 2 is a plan view of the hook, and

Figure 3 is a transverse sectional view taken on a line 3—3 of Figure 2.

Referring now to the drawing in detail, the numeral 5 designates the hook generally which is in the form of an oval link having a longitudinal opening 6 therein and an attaching opening 7 adjacent one end of the hook for attaching to the end of a chain 8 by means of a ring 9.

A lateral slot or opening 10 is formed in one side of the hook communicating with the opening 6 adjacent the attached end of the hook, the slot being curved as shown in Figure 2 and adapted for receiving a link of the chain edgewise for guiding the link into the opening 6 wherein the link will occupy a position substantially at right angles to the hook.

The edges of the opening 6 are beveled as shown at 11 to form a shallow seat at each side of the hook adapted to receive the ends of the adjacent links of the chain which are disposed crosswise of the opening 6 and thus prevent slipping of the chain through the hook.

By providing a hook of this character adapted to engage the outside edges of a chain link, the hook may be attached in the desired position with greater ease and facility, and at the same time is free of any protruding ends or bills which might engage other objects or injure the hands or body of a workman.

The laterally curved slot or opening prevents accidental removal of the link from the hook and pressure or pull on the hook is exerted in the center of the free end of the hook in a straight line longitudinally of the hook and the attached end of the chain.

It is believed the details of construction and manner of use of the device will be readily understood from the foregoing without further detailed explanation.

Having thus described the invention what I claim is:

1. A chain hook comprising an oval-shaped body having substantially parallel side and also having an attaching opening at one end and a longitudinal opening at its central portion adapted to substantially conformably receive a chain link in a position at right angles to the body, a bill portion at the outer end of the body extending longitudinally in the plane of one side of the body, and a projection at said one side of the body in the plane of the bill and spaced from the end thereof to form a lateral reentrance slot in said one side of the body, said slot being curved outwardly toward the outer end of the body.

2. A chain hook comprising an oval-shaped body having substantially parallel side and also having an attaching opening at one end and a longitudinal opening at its central portion adapted to substantially conformably receive a chain link in a position at right angles to the body, said longitudinal opening being beveled along body edges and at opposite sides of the body and forming seats at the opposite sides of the body for the ends of adjacent chain links, and a lateral slot in one longitudinal side of the body communicating with the longitudinal opening adjacent its attached end, said lateral slot being curved outwardly toward the outer end of the body and adapted to guide the link into said longitudinal opening.

3. A chain hook comprising an oval-shaped body having substantially parallel side and also having an attaching opening adjacent its inner end and a longitudinal opening at its central portion adapted to substantially conformably receive a chain link in a position at right angles to the body, and a lateral slot in one longitudinal side of the body communicating with the longitudinal opening and adapted to guide the link into said last-named opening, said slot being disposed adjacent the inner end of the body and curved outwardly toward the end of the body.

FRANK WILSON.